Patented May 26, 1931

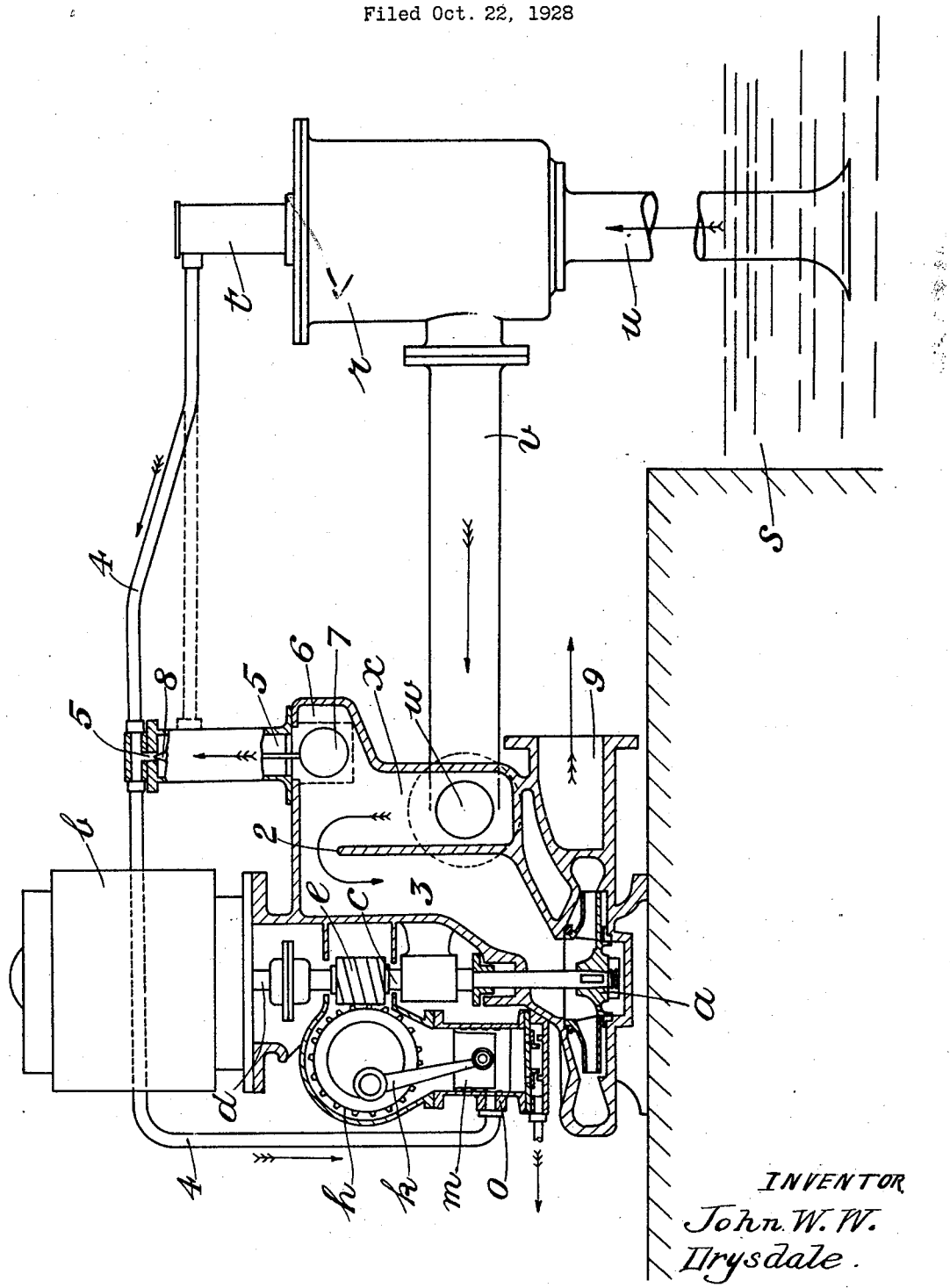

1,807,515

UNITED STATES PATENT OFFICE

JOHN WHITEHEAD WILSON DRYSDALE, OF YOKER, GLASGOW, SCOTLAND, ASSIGNOR TO DRYSDALE & COMPANY, LIMITED, OF GLASGOW, SCOTLAND

LUBRICATING SYSTEM

Application filed October 22, 1928, Serial No. 314,296, and in Great Britain November 28, 1927.

This invention relates to lubricating systems, e. g. for machinery, in which oil is supplied to the parts to be lubricated by a pump, and drains, or is discharged, from the lubricated parts into a sump or tank or reservoir from which it is withdrawn and delivered again by the said pump to the said parts to serve again as lubricant.

Wherever the term "oil" is used in this specification (including the claims) it is intended to include any liquid, or substance or mixture mainly liquid and able to flow freely, of an oily nature, used as a lubricant.

In the lubricating of machinery the lubricating oil tends to become aerated. This aeration has serious objections; and it is the object of the present invention to de-aerate the oil as far as possible and by means convenient and efficient.

According to the present invention—which will be defined in the annexed claims—the oil drains, or is discharged, as aforesaid, into a sump or tank or reservoir. It is withdrawn from this sump or the like by an oil pump which delivers it again to the parts to be lubricated. The present invention is characterized by the provision of a de-aerating apparatus through which the oil is drawn in passing from the said sump or the like to the said pump, an air pump or exhauster, coupled to, or driven by, the said oil pump or the motor which drives the same, and a pipe connection from the said de-aerating apparatus to the said air pump, whereby the air separated from the oil in the said apparatus is withdrawn from the same by the air pump.

The air pump or exhauster may be of any suitable type or nature. The oil pump may be reciprocating, positive rotary, or centrifugal or turbine. An especially convenient form of oil pump to employ is one constructed as described in the specification of U. S. Patent No. 1,474,708.

One convenient manner of carrying the present invention into effect will now be described, the oil pump being as described in the specification of patent aforesaid. Reference will be made to the accompanying drawing.

$a$ is the impeller of the oil pump. It is mounted on the shaft $c$ which is coupled direct to the shaft $d$ of the electric motor $b$ which thus drives the pump. The shaft $c$ carries a worm $e$ which meshes with a worm wheel $h$ which through the connecting rod $k$ drives the piston $m$ of the air pump $o$.

$s$ is the sump into which the oil from the lubricated parts drains or is discharged. $r$ is the de-aerating apparatus. It is of the static type, that is, there are in it no mechanically operated parts. The construction of this de-aerating apparatus is not of consequence in the present invention except for the statement just made and for the further statement that the apparatus contains, or is furnished with, an air-collecting chamber $t$—the position and form of which are not here of consequence—in which the separated air can collect. The oil is drawn by the oil pump $a$ from the sump through the pipe $u$ into and through the de-aerating apparatus $r$ and then by way of the pipe $v$ and through the port $w$ into the receiver $x$ of the oil pump. The oil is then drawn over the weir 2 into the suction passage 3 and thus to the impeller of the pump. 9 is the oil discharge.

The air pump $o$ draws the air from the collecting chamber $t$ by way of the pipe 4. On this pipe there is a branch 5 leading to the air-collecting chamber 6 at the top of the oil receiving chamber $x$. The oil in entering the pump and passing over the weir 2 discharges air which collects in the chamber 6 and is drawn off by the branch 5 and pipe 4 to the air pump. The air pump thus serves two purposes.

A valve 8 controls the opening through the branch 5 so as to prevent oil entering the air pipe. The valve is controlled by a float 7. Should the oil level rise to a dangerous height the float will rise and close the valve.

The pipe 4, instead of being led from the collecting chamber $t$, as shown in full lines, may be arranged as shown in dotted lines so as to enter the branch 5 below the valve 8. This arrangement obviates the chance of oil being drawn from the de-aerating apparatus $r$ to the air pump.

When this arrangement is not adopted and the pipe 4 is led as shown in full lines, a float and valve similar to 7 and 8 may be provided (with the same object in view) in the collecting chamber *t*.

Having thus described my invention, what I claim as new and desire to secure by Letters Patent is:—

1. A lubricating system including a tank for receiving the oil discharged from the lubricated parts, an oil pump for withdrawing the oil from the said tank and delivering it again to the parts to be lubricated, a motor for driving the said pump, a de-aerating apparatus, a pipe connection from the said tank to the said de-aerating apparatus, a pipe connection from the said de-aerating apparatus to the said oil pump, an air pump driven by the said motor, a pipe connection from the said de-aerating apparatus to the said air pump, an oil-receiving chamber in the said oil pump, an air-collecting chamber at the top of the said oil-receiving chamber, and a pipe connection from the said air-collecting chamber to the said air pump.

2. A lubricating system including a tank for receiving the oil discharged from the lubricated parts, an oil pump for withdrawing the oil from the said tank and delivering it again to the parts to be lubricated, a motor for driving the said pump, a de-aerating apparatus of the static type having an air-collecting chamber at its upper end, a pipe connection from the said tank to the said de-aerating apparatus, a pipe connection from the said de-aerating apparatus to the said oil pump, an air pump driven by the said motor, a pipe connection from the air-collecting chamber of said de-aerating apparatus to the said air pump, an oil-receiving chamber in the said oil pump, an air-collecting chamber at the top of the said oil-receiving chamber, and a pipe connection from this last-mentioned air-collecting chamber to the said air pump.

I hereby sign my name to this specification.

JOHN WHITEHEAD WILSON DRYSDALE.